United States Patent
Gilbert et al.

(10) Patent No.: US 10,743,460 B2
(45) Date of Patent: Aug. 18, 2020

(54) CONTROLLED AIR PULSE METERING APPARATUS FOR AN AGRICULTURAL PLANTER AND RELATED SYSTEMS AND METHODS

(71) Applicant: Ag Leader Technology, Ames, IA (US)

(72) Inventors: Douglas Gilbert, Ames, IA (US); Jeff Westbrook, Ames, IA (US); Alex Hartogh, Huxley, IA (US)

(73) Assignee: Ag Leader Technology, Ames, IA (US)

(*) Notice: Subject to any disclaimer, the term of this patent is extended or adjusted under 35 U.S.C. 154(b) by 0 days.

(21) Appl. No.: 16/150,516

(22) Filed: Oct. 3, 2018

(65) Prior Publication Data

US 2019/0098827 A1   Apr. 4, 2019

Related U.S. Application Data

(60) Provisional application No. 62/567,614, filed on Oct. 3, 2017.

(51) Int. Cl.
| | |
|---|---|
| *A01C 7/04* | (2006.01) |
| *A01C 7/10* | (2006.01) |
| *A01C 7/16* | (2006.01) |
| *A01C 7/08* | (2006.01) |
| *A01C 7/20* | (2006.01) |
| *A01C 21/00* | (2006.01) |

(52) U.S. Cl.
CPC .............. *A01C 7/042* (2013.01); *A01C 7/081* (2013.01); *A01C 7/082* (2013.01); *A01C 7/084* (2013.01); *A01C 7/102* (2013.01); *A01C 7/16* (2013.01); *A01C 7/20* (2013.01); *A01C 7/04* (2013.01); *A01C 7/105* (2013.01); *A01C 21/00* (2013.01)

(58) Field of Classification Search
CPC ........... A01C 7/16; A01C 7/081; A01C 7/082; A01C 7/084; A01C 7/042; A01C 7/102
See application file for complete search history.

(56) References Cited

U.S. PATENT DOCUMENTS

| | | | |
|---|---|---|---|
| 2,566,406 A | 9/1951 | Dougherty | |
| 4,029,235 A | 6/1977 | Grataloup | |
| 6,651,570 B1 | 11/2003 | Thiemke | |
| 6,752,095 B1 | 6/2004 | Rylander et al. | |
| 7,490,565 B2 * | 2/2009 | Holly | A01C 7/044 |
| | | | 111/174 |
| 7,581,684 B2 * | 9/2009 | des Garennes | A01B 45/00 |
| | | | 239/162 |
| 8,336,471 B2 | 12/2012 | Gilstring | |

(Continued)

FOREIGN PATENT DOCUMENTS

WO    2013130003 A1    9/2013

*Primary Examiner* — Alicia Torres
(74) *Attorney, Agent, or Firm* — Davis, Brown, Koehn, Shors & Roberts, P.C.; Matthew Warner-Blankenship

(57) ABSTRACT

The devices, systems, and methods herein use air pressure to dispense seed into the ground in a controlled manner. In certain embodiments, a valve is actuated to push a single seed out of a seed chamber. The seed can be conveyed from the metering housing and through a seed delivery apparatus to the furrow at high speed. The seed is rapid conveyed from the seed chamber to the furrow by a precisely controlled air pulse to eliminate variation and enable high planting speeds.

20 Claims, 8 Drawing Sheets

(56) References Cited

U.S. PATENT DOCUMENTS

| | | |
|---|---|---|
| 8,443,742 B2 | 5/2013 | Orrenius |
| 8,671,856 B2 | 3/2014 | Garner et al. |
| 8,746,159 B2 | 6/2014 | Garner et al. |
| 8,789,483 B2 | 7/2014 | Gilstring |
| 8,850,998 B2 | 10/2014 | Garner et al. |
| 9,137,941 B2 | 9/2015 | Stark |
| 9,151,388 B2 | 10/2015 | Gilstring |
| 9,332,689 B2 | 5/2016 | Baurer et al. |
| 9,491,901 B2 | 11/2016 | Gentili |
| 9,510,502 B2 | 12/2016 | Garner et al. |
| 9,578,802 B2 | 2/2017 | Radtke et al. |
| 9,629,301 B2 | 4/2017 | Gentili |
| 9,629,302 B2 | 4/2017 | Gentili |
| 9,661,799 B2 | 5/2017 | Garner et al. |
| 9,706,702 B2 | 7/2017 | Wendte et al. |
| 9,733,634 B2 | 8/2017 | Prickel |
| 9,756,779 B2 | 9/2017 | Wilhelmi et al. |
| 9,769,978 B2 | 9/2017 | Radtke |
| 9,807,924 B2 | 11/2017 | Garner et al. |
| 9,872,424 B2 | 1/2018 | Baurer et al. |
| 2010/0282141 A1 | 11/2010 | Wollenhaupt et al. |
| 2011/0162566 A1 | 7/2011 | Wilhelmi et al. |
| 2015/0223392 A1 | 8/2015 | Wilhelmi et al. |
| 2016/0212932 A1 | 7/2016 | Radtke |
| 2016/0227700 A1 | 8/2016 | Wendte et al. |
| 2016/0249525 A1 | 9/2016 | Baurer et al. |
| 2017/0020058 A1 | 1/2017 | Pirkenseer et al. |
| 2017/0332546 A1 | 11/2017 | Garner et al. |
| 2017/0367255 A1 | 12/2017 | Wilhelmi et al. |
| 2018/0007824 A1 | 1/2018 | Radtke |

\* cited by examiner

CONTROLLED AIR PULSE METERING APPARATUS FOR AN AGRICULTURAL PLANTER AND RELATED SYSTEMS AND METHODS

CROSS-REFERENCE TO RELATED APPLICATION(S)

This application claims the benefit under 35 U.S.C. § 119(e) to U.S. Provisional Application No. 62/567,614, filed Oct. 3, 2017 and entitled "Method for Metering Seed on an Agricultural Planter Using Controlled Pulses of Air," which is hereby incorporated herein by reference in its entirety.

FIELD OF THE INVENTION

The disclosed technology relates generally to devices, systems and methods for use in planting, including high-speed planting technologies, and in particular, to seed metering devices for high speed and accurate seed delivery to the furrow.

BACKGROUND OF THE INVENTION

As agricultural planting technologies continues to improve, high-speed precision agriculture is fast becoming the industry standard. Under these high-speed parameters, agricultural planters are required to put seeds in the ground with precise and repeatable spacing between the seeds in order to maximize crop health and yield. This seed spacing must be maintained at any ground speed. The ability to turn off seed dispensing or changing the seed dispensing rate on individual rows is also highly desirable to eliminate planting overlap and to keep seed spacing consistent across all rows on a curve.

Existing seed metering designs use mechanical meters to place the seeds at the desired spacing. Generally, seed spacing is determined in these designs by the spacing of the seed slots in the metering disc and the speed at which the meter is operated. The meter speed is typically correlated to the implement's ground speed by means of some method of mechanical transmission tied to ground engaged wheels, or, more recently, electric or hydraulic motors are utilized to decouple the meter's speed and subsequent seed spacing from the ground speed of the planter.

One disadvantage of known mechanical seed metering devices is that numerous complicated actuators, sensors, and mechanical elements are required on each row unit in order to achieve such features as row-by-row shut off, consistent seed spacing across all rows on curves, and compensation for variable ground speeds. As the number and complexity of parts in a system grows, that system inherently becomes more expensive and less reliable compared to a simpler system with fewer parts and elements.

There is a need in the art for improved systems, methods, and devices for metering seeds in high-speed planting implements.

BRIEF SUMMARY OF THE INVENTION

Discussed herein are various seed metering systems, including controlled air pulse seed metering devices and systems. Also included are row units and planting systems that incorporate the controlled pulsed air seed metering devices and systems.

In Example 1, an apparatus for metering seed on an agricultural planter comprises a housing, a seed chamber defined within the housing, a seed receiving lumen defined within the housing in fluidic communication with the seed chamber, wherein the seed receiving lumen is disposed adjacent to the seed launching position, and an air pulse source associated with the housing. The seed chamber comprises a seed launching position configured to sequentially receive seeds, and a seed ejection lumen in fluidic communication with the seed launching position. The air pulse source comprises a pressurized air source, and a repeating air pulse generator operably coupled to the pressurized air source, wherein the air pulse generator is in fluidic communication with the seed chamber.

Example 2 relates to the apparatus according to Example 1, wherein the seed receiving lumen is coupleable with a bulk seed container.

Example 3 relates to the apparatus according to Example 1, wherein the seed ejection lumen is coupleable with a seed delivery apparatus. Example 4 relates to the apparatus according to Example 1, wherein the repeating air pulse generator is constructed and arranged to generate repeating air pulses through the seed chamber from the pressurized air source, whereby seeds sequentially disposed on the seed launching position are ejected via the ejection lumen in a serial fashion.

Example 5 relates to the apparatus according to Example 1, wherein the air pulse generator is in fluidic communication with the seed chamber via an air intake lumen, wherein the air intake lumen and the seed chamber form a main air path such that repeating air pulses from the air pulse generator pass through the air intake lumen, the seed launching position, and the seed ejection lumen.

Example 6 relates to the apparatus according to Example 5, wherein the main air path is disposed substantially horizontally.

Example 7 relates to the apparatus according to Example 1, wherein the pressurized air source is configured to provide pressurized air ranging from about 20 to about 60 psi.

Example 8 relates to the apparatus according to Example 1, wherein the repeating air pulse generator is a valve.

Example 9 relates to the apparatus according to Example 1, wherein the seed receiving lumen is disposed at an angle in relation to a horizontal reference point with respect to the housing.

Example 10 relates to the apparatus according to Example 1, further comprising a seed retention structure disposed across at least a portion of a width of the seed chamber, wherein the seed retention structure is positioned adjacent to the seed launching position.

In Example 11, a system for planting seed comprises a planter having a plurality of row units, each row unit comprising a furrow opening mechanism, wherein each row unit is operably coupled to a bulk seed supply, and a plurality of the apparatus of claim 1, wherein each of the plurality is coupled with one of the plurality of row units.

Example 12 relates to the system according to Example 11, further comprising a programmable controller operably coupled to the repeating air pulse generator of each of the plurality of the apparatuses of claim 1, wherein the programmable controller is configured to control the repeating air pulse generator based on input air pressure, desired seed spacing, ground speed, and turning radius.

Example 13 relates to the system according to Example 12, further comprising at least one sensor disposed on each of the plurality of the apparatuses of claim 1, wherein the at least one sensor is operably coupled to the programmable controller.

In Example 14, an apparatus for metering seed on an agricultural planter comprises a housing, a seed chamber defined within the housing, a seed receiving lumen defined within the housing in fluidic communication with the seed chamber, wherein the seed receiving lumen is disposed adjacent to the seed launching position, a first air source in fluidic communication with the seed chamber, wherein the first air source is constructed and arranged to provide a continuous stream of air, and an air pulse source associated with the housing. The seed chamber comprises a seed launching position configured to sequentially receive seeds, and a seed ejection lumen in fluidic communication with the seed launching position. The air pulse source comprises a second air source, and a repeating air pulse generator operably coupled to the second air source, wherein the air pulse generator is in fluidic communication with the seed chamber, wherein the repeating air pulse generator is constructed and arranged to generate repeating air pulses from the second air source.

Example 15 relates to the apparatus according to Example 14, wherein the first and second air sources are configured to provide pressurized air ranging from about 0.5 to about 5 psi.

Example 16 relates to the apparatus according to Example 14, wherein the first air source is in fluidic communication with the seed chamber via a first air intake lumen, and wherein the air pulse generator is in fluidic communication with the seed chamber via a second air intake lumen disposed adjacent to the seed receiving lumen such that each of the repeating air pulses is configured to urge a seed from the seed receiving lumen toward the seed launching position.

In Example 17, a method of metering seed in an agricultural planter comprises supplying a supply of seeds to a housing via an angled seed receiving lumen defined within the housing, urging a first seed from the seed receiving lumen to a seed chamber, discharging a first controlled air pulse from a pressurized air source through the seed chamber such that the first seed is urged from the seed positioning location and out of the seed ejection lumen, and repeating the urging and discharging steps for a second seed and subsequent seeds in a repeating, serial fashion. The seed chamber comprises a seed positioning location, and a seed ejection lumen, wherein the first seed is disposed on the seed positioning location.

Example 18 relates to the method according to Example 17, further comprising retaining the first seed at the seed positioning location prior to the discharging of the first controlled air pulse with a seed retention structure disposed adjacent to the seed positioning location.

In Example 19, a seed singulation or counting device comprises a spinning disk, a seed retaining wall disposed on one side of the disk, wherein the seed retaining wall is positioned at an outer perimeter of the disk and defines with the spinning disk an inner volume of the device, a seed exit lumen attached to the seed retaining wall such that the seed exit lumen extends from the inner volume of the device to an exterior of the device through the seed retaining wall, wherein the seed exit lumen is sized and shaped to receive one seed at a time, an opening defined in the seed exit lumen, wherein the opening is disposed within the inner volume and adjacent to an inner surface of the seed retaining wall, and a projection attached to the inner surface of the seed retaining wall and disposed adjacent to the opening. The projection comprises an angled contact surface disposed at an angle in relation to the inner surface, and a ceiling disposed at a predetermined distance from the spinning disk, wherein the ceiling is parallel to the spinning disk.

Example 20 relates to the device according to Example 19, wherein the seed retaining wall is stationary.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Known precision and high-speed agricultural technologies have created the need for seed metering systems and devices that provide precise and repeatable seed spacing that can be maintained at any ground speed. The various embodiments herein relate to seed metering devices and systems that singulate seeds and eject the seeds into a seed delivery apparatus via pressurized air pulses. It is understood that the various seed metering implementations disclosed or contemplated herein can be incorporated into any known planting or seeding machine, such as, but not limited to, row crop planters, grain drills, air seeders, etc.

Figure 1A:
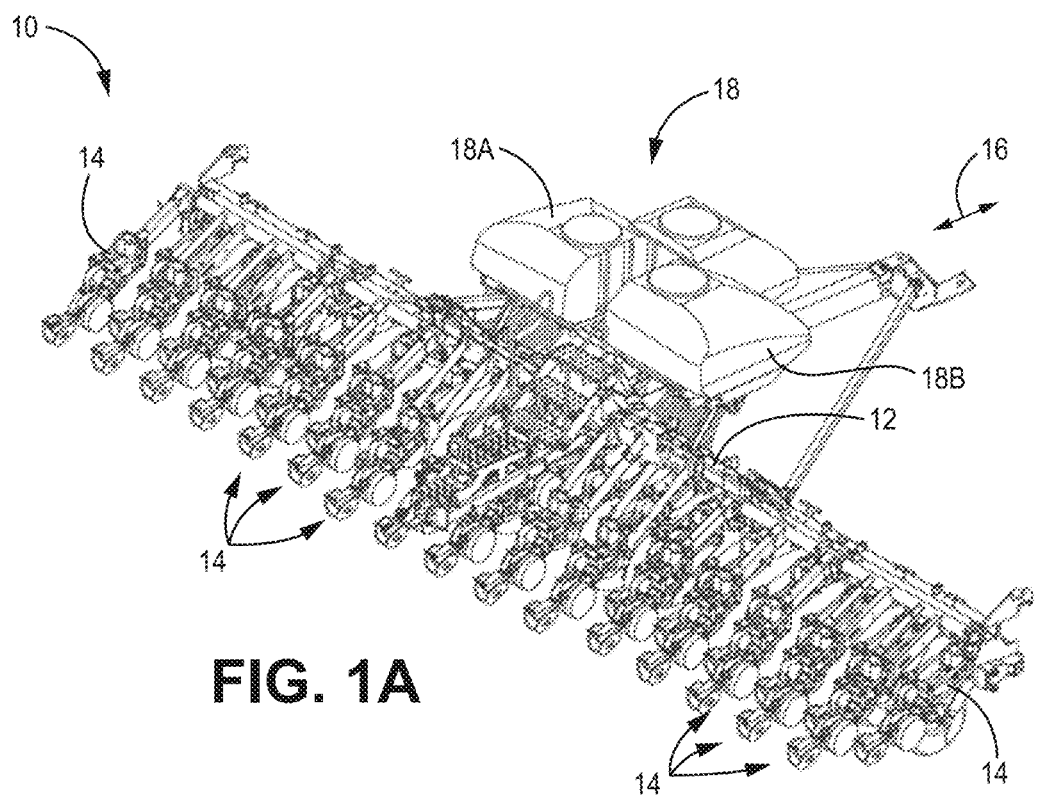
FIG. 1A is a perspective view of a planting system, according to one embodiment.

FIG. 1A depicts an exemplary planter or seeding machine 10 that, according to one embodiment, can have a controlled air pulse seed metering system as disclosed or contemplated herein. The planting machine 10 in this specific implementation is a row crop planter 10 having a central crossbar 12 and multiple planting row units 14 mounted to the crossbar 12. At least one hopper (also referred to herein as a "storage tank") 18 is disposed on the seeding machine 10 to hold seed and is fluidically coupled to unit hoppers (also referred to as "mini-hoppers") (such as hopper 34 as discussed below) on each planting unit 14 such that seed can be delivered pneumatically from the hopper 18 to a unit hopper (such as hopper 34) on each unit 14. Alternatively, the planter 10 has two hoppers 18A, 18B as shown. In a further alternative, any known hopper or seed retention device configuration can be incorporated into the planter 10 and the separate units 14 and function with the seed metering system embodiments herein. It is understood that, generally, the row units 14 on a particular planter (such as exemplary planter 10) are typically identical or substantially similar. The seeding machine 10 moves forward and backward via the fore-aft direction shown by the arrow 16.

Figure 1B:
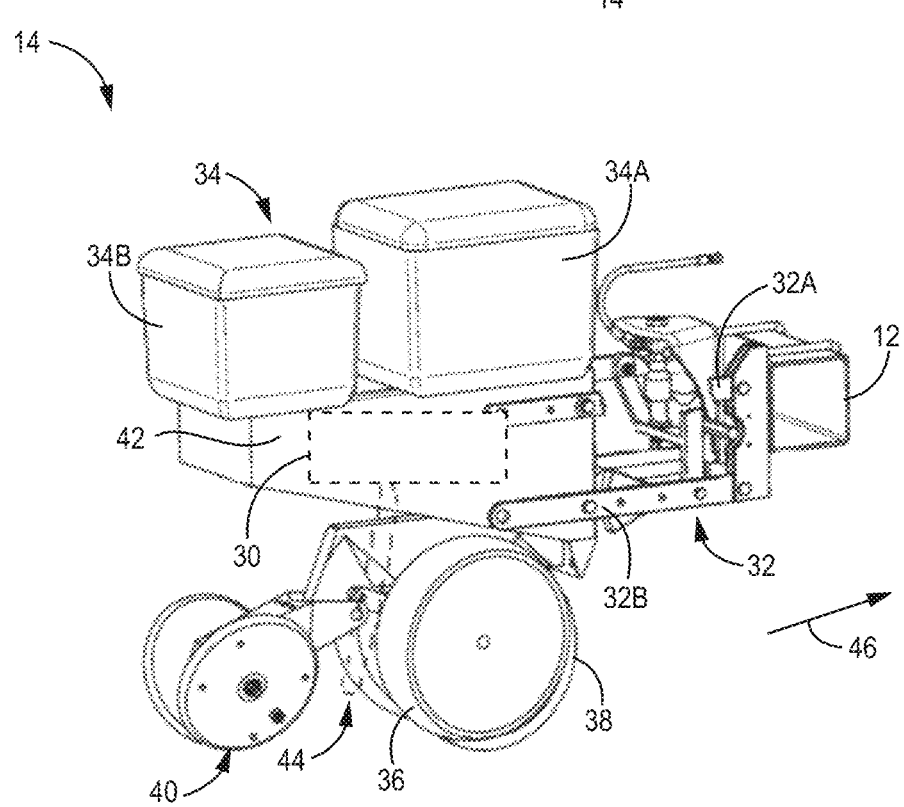
FIG. 1B is a perspective view of a row unit for a planting system, according to one embodiment.

One example of a row unit 14 having a controlled air pulse seed metering system 30, according to one embodiment, is depicted in greater detail in FIG. 1B. It is understood that any controlled air pulse seed metering system according to any embodiment disclosed or contemplated herein (such as system 30) can be incorporated into any known row unit having any configuration. This particular exemplary row unit 14 is jointedly coupled to the central crossbar 12 via a parallelogram linkage 32 made up of two linkage arms 32A, 32B such that the individual units 14 are vertically moveable by a predetermined amount relative to the crossbar 12. The exemplary row unit 14 in this implementation has known components, including a hopper 34, gauge wheels 36 (controlling the depth of the furrow), furrow opening disks 38 (to form an open furrow in the soil beneath the seeding machine into which seed is deposited), and a closing and packing wheel (or wheels, in this specific example) 40 (to close the furrow over the deposited seed and to firm the soil in the closed furrow), as are generally understood in the art. Alternatively, any similar known components or features or additional known features or components can be incorporated into the row units 14. According to certain embodiments, including the exemplary embodiment as shown, the hopper 34 is made up of at least two hoppers 34A, 34B. For example, in one implementation, the hopper 34 is made up of one seed hopper 34A and a chemical hopper 34B, such that the seed hopper 34A contains seed and the chemical hopper 34B can contain a herbicide, insecticide, or any other known chemical for application while planting, including any combination thereof. Alternatively, the unit 14 can have two seed hoppers and a chemical hopper. In a further alternative, any known combination of hoppers can be incorporated herein. In this implementation, the seed metering system 30 is disposed on the row unit 14, and more specifically, coupled to, or disposed within, the frame member 42 thereof, such that it can be in operably communication with the hopper 34 and the seed delivery system 44. The frame member 42 is jointedly coupled to the parallelogram linkage 32. The seed is stored or retained in the seed hopper 34 and provided to the seed meter 30. In one implementation, the seed hopper 34 is coupled to the seed metering device 30 via a tubular connection (which can be referred to herein as a "seed feeding tube") (not shown), as will be discussed in additional detail below. From the seed meter system 30, the seed is carried by the delivery system 44 into a planting furrow, or trench, formed in the soil by furrow opening disks 38. It is understood that the controlled air pulse seed metering system embodiments as disclosed or contemplated herein (including system 30) can be coupled to and operate with any known seed delivery system. The crossbar 12 and row unit 14 are designed to be moved over the ground in a forward working direction identified by arrow 46.

According to various embodiments as disclosed or contemplated herein, the various controlled air pulse metering systems can be used to convey out of the seed metering system 30 and through the seed delivery system 44. In certain implementations, the seed metering system 30 can be used with a seed delivery system 44 that utilizes a seed tube 44 such that the seed is conveyed out of the seed metering system 30, through the seed tube 44, and out of the tube 44 into the furrow at a high rate of speed that is generated by the air pulse. In this embodiment, the rapid conveyance from the seed metering device 30 to the furrow by the precisely-controlled air pulse can eliminate the variation from a known gravity-powered seed tube and enable higher planting speeds.

Figure 2:
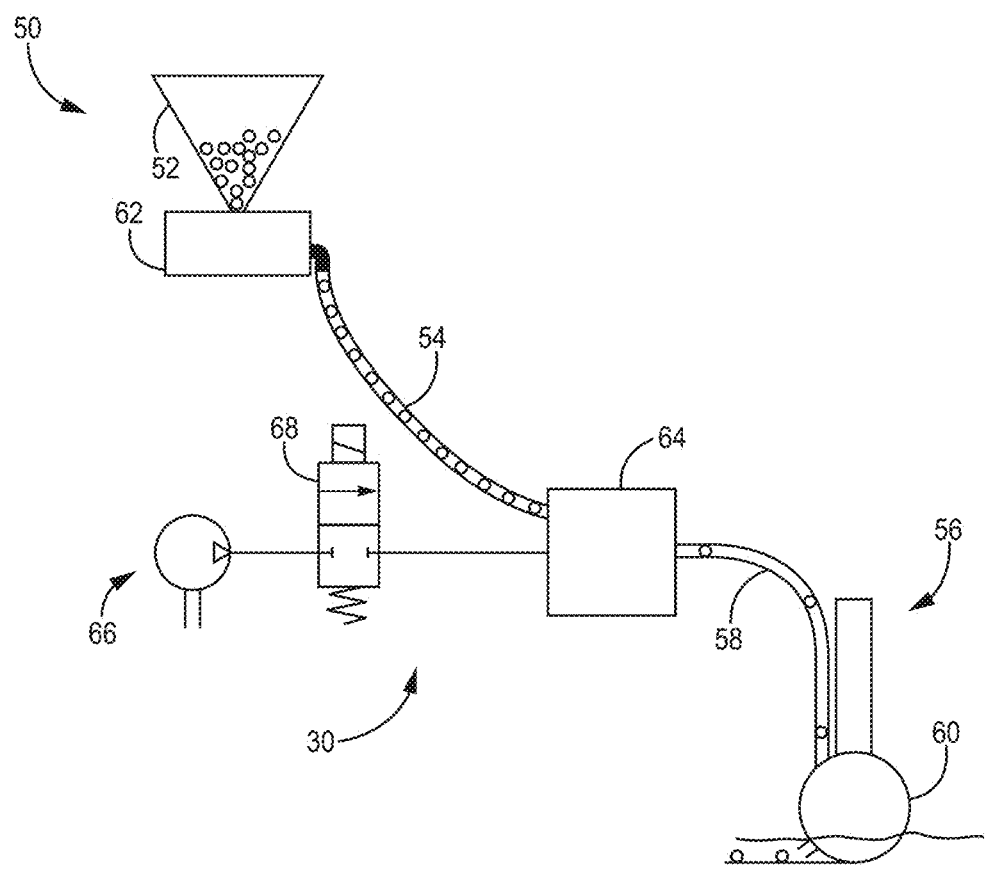
FIG. 2 is a schematic view of a row unit with a seed metering system, according to one embodiment.

A diagrammatic depiction of a controlled air pulse seed metering system 30 incorporated into a row unit 50 according to one embodiment is shown in FIG. 2. Certain components of the row unit 50 are depicted schematically, including the seed hopper 52, the seed feeding tube 54, the seed metering system 30, and the seed delivery apparatus 56. The seed delivery apparatus 56 has a seed delivery tube 58 and furrow opening disks 60. It is understood that the various components depicted in FIG. 2 constitute components of a row unit 50, which, while being depicted schematically in this figure, can take the form of any known row unit configuration (such as, for example, row unit 14 as shown in FIG. 1B). As such, in certain implementations, each row unit (such as row unit 14 or 50) on a planting machine can have all of these components. Alternatively, it is understood that the planting machine can have a single consolidated seed supply source (such as a single large see hopper) at a central location on the planting machine, a single consolidated chemical source (such as a single large chemical hopper), or any other such consolidated component or feature as is known in the art such that there is no need for such components to be provided individually on each row unit. Other row configurations are also contemplated herein, as will be discussed in further detail below.

In one alternative embodiment, the row unit 50 can also have a seed singulation device 62 attached to the hopper 52 such that seeds from the hopper 52 move from the hopper 52 into the seed singulation device 62. Once the seeds are disposed in the singulation device 62, the device 62 operates to isolate or singulate the seeds such that the seeds move from singulation device 62 through the seed feeding tube 54 to the seed metering system 30 in a separate, singulated fashion. In one embodiment, the singulation device 62 can be substantially similar to the seed singulation device depicted in FIGS. 11A-11C and discussed in further detail below.

In the specific implementation as shown in FIG. 2, the seed metering system 30 is a controlled air pulse metering device 30 having a seed metering housing 64, a pressurized air source 66, and a valve 68 disposed between the air source 66 and the housing 64 such that the valve 68 can be used to control the air pulses originating from the air source 66, as will be described in additional detail below.

According to one embodiment, the seed feeding tube 54 and the seed delivery apparatus 56 can vary in length as needed or desired. As such, the seed metering housing 64 can be physically positioned near, far, or intermediate from the furrow opening disks 60 on the row unit 50. For example, if the metering housing 64 is disposed close to the opening disks 60, the seed delivery apparatus 56 can be relatively short and the distance between seed ejection from the housing 64 and seed placement in the furrow formed by the furrow opening disks 60 is similarly short. On the other hand, because air pressure propels each seed from housing 64 according to the various embodiments herein, the housing 64 can be positioned farther away from the furrow in comparison to known gravity-based seed delivery systems.

Figure 3:
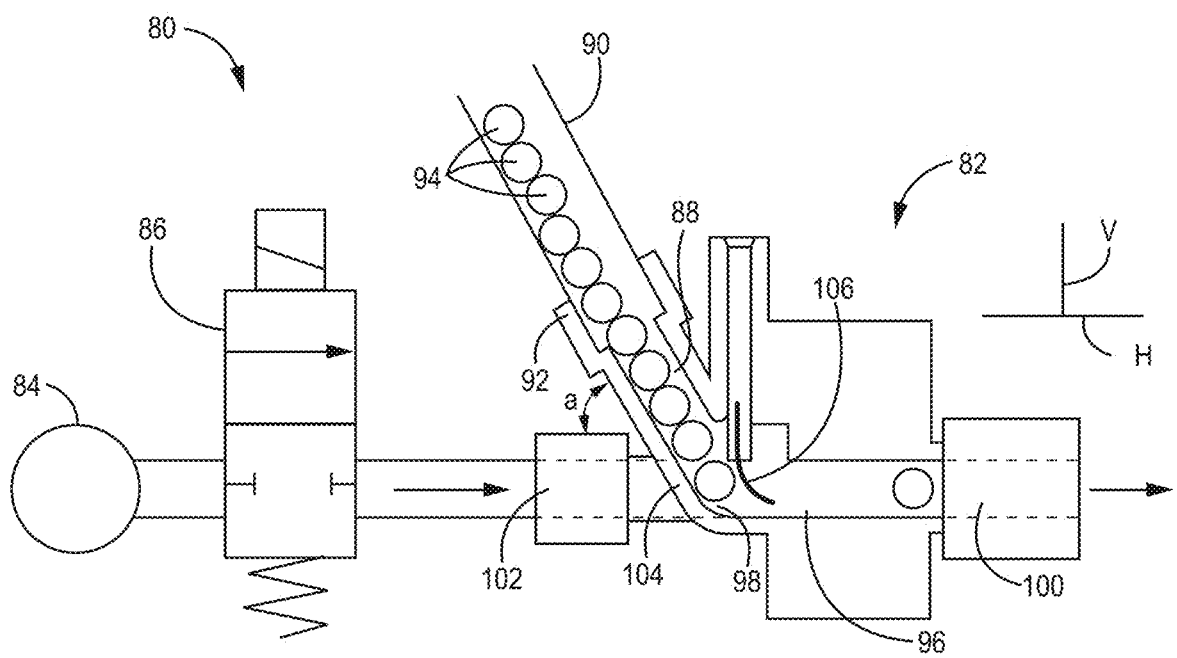
FIG. 3 is a cross-sectional, partial cutaway view of a seed metering system, according to one embodiment.

One schematic depiction of a seed metering system 80 according to one embodiment is depicted in FIG. 3. In this implementation, the system 80 includes a metering housing 82, an air source 84, and a valve 86. Further, the housing 82 has a seed receiving lumen 88 that is in operable communication with the seed feeding tube 90 (which can, in certain embodiments, be the feeding tube 54 of the row unit 50 discussed above) such that the seed feeding tube 90 is coupled to the lumen 88 at port 92. Alternatively, any coupling mechanism can be used to couple the tube 90 to the lumen 88. As such, seed 94 can be transported into the seed receiving lumen 88 via the seed feeding tube 90 as shown.

Further, the housing 82 has a seed chamber 96 with a seed positioning location (also referred to herein as a "launching position" or "launch position") 98 and a seed ejection lumen 100 extending from the chamber 96 as shown. Further, a seed retention structure 102 is disposed within the chamber 96 as well. Further, the pressurized air source 84 is in fluidic communication with the seed chamber 96 via the valve 86 and the air intake lumen 102, and, more specifically, via the opening 104 defined between the intake lumen 102 and the chamber 96. The pressurized air source 84 can supply a pressurized pulse of air via the valve 86 and through the air intake lumen 102 and air intake opening 104 into the seed chamber 96, as will be discussed in further detail below. Thus, in one embodiment, the seed positioning location 98 is disposed at the juncture of the seed receiving lumen 88, the seed chamber 96, the air intake lumen opening 104, and the seed retention structure 106. As such, a seed 94 in the seed receiving lumen 88 is urged (by gravity, in this implementation) toward the seed positioning location 98 and temporarily retained in that location 98 by the seed retention structure 106 prior to the generation of the pressurized pulse of air. As will be discussed in further detail below, a pressurized pulse of air delivered via the air intake lumen 102 and the opening 104 overcomes the force of the retention structure 106 and causes the seed to be urged along the chamber 96 toward and out of the seed ejection lumen 100, which is coupled to the seed delivery apparatus.

According to certain implementations, the configuration of the seed metering housing 82 (along with any other housing embodiment disclosed or contemplated herein), with the seed receiving lumen 88, the seed chamber 96, and the air intake lumen 102, along with the use of the controlled air pulses and gravity combined with the venturi effect (as discussed elsewhere herein) results in a device that can meter seeds in a consistently repeatable fashion at a high rate of speed.

In accordance with one embodiment, the seed receiving lumen 88 is disposed at an angle in relation to the horizon (also referred to as the "horizontal") (as represented in FIG. 3 by line H) and in relation to the vertical (as represented by line V). In one embodiment, the seed receiving lumen 88 is at an angle "a" as shown in the figure, which allows the lumen 88 to utilize gravity to urge the seeds 94 toward the chamber 96, and more specifically, toward the seed positioning location 98. More specifically, in one implementation, the seed receiving lumen 88 is at an angle "a" of about 45 degrees in relation to the horizon H. Alternatively, the seed receiving lumen 88 can be disposed at any angle "a" ranging from about 1 degree to about 90 degrees in relation to the horizon H that utilizes gravity to urge the seeds 94 toward the seed positioning location 98. In any implementation in which the lumen 88 is disposed at an angle, gravity can be utilized to assist with urging the seeds 94 toward the chamber 96. Further, it is understood that the force with which the seeds 94 are delivered into the seed receiving lumen 88 can influence the delivery of those seeds 94 from the lumen 88 to the chamber 96. For example, if the system 80 in FIG. 3 or any other seed metering embodiment is coupled to a row unit (such as, for example, row unit 50) having any mechanism such as the seed singulation device 62 that delivers the seed toward the seed metering housing 82 with some force, that force can also influence the force with which the seed 94 is urged from the seed receiving lumen 88 to the seed chamber 96. Alternatively, the seed receiving lumen 88 can have any configuration and need not be disposed at an angle relative to the horizon H. In a further embodiment, other components or mechanisms for feeding seed to the seed chamber 96 can be incorporated, any of which may or may not utilize gravity or other forces.

In one implementation, the discharge of a controlled pulse of air to eject the seed 94 from the launch position 98 out of the ejection lumen 100 can also create a venturi effect, which is the creation of a local low pressure region as a result of high fluid velocity. That is, the burst of air through the chamber 96 that urges a first seed 94 from the seed launch position creates an area of low pressure at or around the launch position 98. This area of low pressure created by the controlled air pulse launching the first seed 94 creates a small vacuum effect that urges a second seed 94 in the seed intake lumen 88 toward and into the launch position 98 with greater force than gravity alone. The extra force resulting from the combination of gravity and the venturi effect increases the speed at which the second seed 94 is moved into the launch position 98. As such, in certain embodiments, the venturi effect combined with gravity is a factor that helps to provide higher metering rates without the need for moving mechanical parts in the metering system 80. It is understood that the seed chamber 96 in this implementation can have dimensions that are specifically intended to optimize the venturi effect—ensuring that the amount of the pressure reduction is at the appropriate level to apply the appropriate amount of force to urge the next seed 94 into the seed positioning location 98 while also ensuring that the level of pressure is not so great that it urges more than one seed into the chamber 96 or urges the single seed past the seed positioning location 98 and further into the chamber 96.

According to one embodiment, the seed retention structure 106 is a tensioned flap 106 that is configured to be tensioned such that it is continuously urged toward the intake opening 104. Alternatively, the structure 106 can be tensioned to be urged toward the relative position in which it is shown in FIG. 3, thereby creating the seed positioning location 98 between the structure 106 and the opening 104. That is, the structure 106 is in an untensioned, resting state at the position depicted in FIG. 3 in which the structure 106 is disposed across the width of the chamber 96 such that the structure 106 retains a seed disposed at the launching position 98 in place. As the structure 106 is urged away from its untensioned, resting position, such as by a seed 94 being urged past the structure 106 as a result of a discharge of a controlled air pulse, the structure 106 is configured such that the farther the structure 106 is urged from its resting position, the greater force applied to the structure to return to that position. Regardless of the specific position, the structure 106 is disposed to retain the seed 94 in its position at the seed positioning location 98 until the controlled air pulse is provided by the pressurized air source 84 and valve 86. That is, the retention structure 106 applies sufficient force to the seed 94 or maintains its position with sufficient force to retain the seed 94 in its place at the seed positioning location 98 without the application of any outside forces. However, the retention structure 106 does not have sufficient force to retain the seed 94 in place when the controlled pulsed air is provided as described herein. That is, the force applied to the seed 94 in the seed positioning location by the controlled air pulse originating from the air source 84 and valve 86 via the air intake lumen 102 and opening 104 is sufficient to overcome the retention structure 106 such that the seed 94 is urged past the retention structure 106, through the chamber 96 and out of the ejection lumen 100.

In accordance with one embodiment, the retention structure 106 can operate to prevent the movement of more than one seed into the chamber 96 from the seed intake lumen 88 as a result of gravity (and potentially the venturi effect discussed elsewhere herein), thereby preventing two or more seeds from being ejected at the same time. Further, as discussed above, the structure 106 also serves to help position each seed in the launch position 98 prior to controlled air pulse that will eject the seed 94 through the ejection lumen 100.

In one embodiment, the seed retention structure 106 is a flap 106 as discussed above. Alternatively, the retention structure 106 can be any arm, flap, finger, bristle, two or more bristles, or any other type of projection that extends across the width of the chamber 96 so as to retain the seed 94 in the seed positioning location 98 until the controlled pulse of air is delivered as described above.

In alternative embodiments as will be discussed in further detail below, the retention structure 106 can be disposed within the seed intake lumen 88 at some point upstream of the launching position 98. In a further alternative, a retention structure 106 can be disposed downstream of the launching position 98 in the seed chamber 96. In yet another alternative, two retention structures 106 can be provided and disposed in any two of the locations discussed herein.

The valve 86, according to certain implementations, operates in conjunction with the pressurized air source 84 to supply the intermittent controlled air pulses that are adapted to serially eject seed out of the housing 82 through the seed ejection lumen 100. In one specific embodiment, the valve 86 is a known high-speed, solenoid-controlled pneumatic valve 86. In certain embodiments, the valve 86 is a 3/2 valve. Alternatively, two-way valves may also be used. In a further alternative, any known valve and pressurized air source that can provide the necessary air pulses can be used. One specific, non-limiting example of a valve that can be used in certain embodiments is the Model MHE3, which is commercially available from Festo of Esslingen am Neckar in Germany.

In accordance with other alternative embodiments, different components or methods for providing controlled pulses of air into the seed chamber 96 can also be used. Further, the specific characteristics of the valve 86 and the pressure source 84 can vary according to need or desire. For example, in certain alternatives, the pressurized air source can be a separate component dedicated to a single seed metering system 80 or multiple such systems 80 across multiple row units (such as row unit 14 or 50). In other words, a single air source can be provided on a planter that can be used for all seed metering systems across all the row units, or two or more air sources can be provided, or a separate air source for each metering system can be used. In a further alternative, if the existing planting unit or tractor has an on-board regulated pressurized air source, that air source could be operably coupled to the system 80 and utilized to provide the controlled air pulses.

In one alternative embodiment, the system 80 can also have a pressure regulator (not shown) operably coupled to the air source 84 that can assist with regulating the generation of the pressurized air by the air source 84. It is further understood that any embodiment of any system disclosed or contemplated herein can have a pressure regulator.

The controlled air pulses are controlled, time-limited blasts or discharges of air that are generated by the pressurized air source 84 and valve 86 in a sequentially-time serial fashion. That is, one discharge is generated to cause a seed 94 disposed at the launch position 98 to be urged through the chamber 96 and out of the ejection lumen 100 as discussed above. That discharge is of a limited, predetermined amount of force and time that is solely sufficient to eject the seed 94. After the previous discharge, a predetermined period of time passes before the next discharge. It is understood that the period between discharges is sufficient for another seed 94 to move into the launch position 98. And each subsequent discharge or pulse of air and period of time after repeats in a sequential and substantially similar fashion.

Thus, the valve 86 is actuated to quickly discharge an appropriate pulse of air originating from the air source 84 and thereby urge a single seed out of the seed chamber 96. The desired spacing of the seeds is accomplished, according to one embodiment, by actuating the valve with a pulse width and frequency calculated using desired seed spacing, ground speed, turning radius, and available air pressure. The inlet air pressure to the valve can be adjusted by a regulator (not shown) as a function of seed rate to improve spacing consistency.

It is understood that the strength and duration of the controlled air pulses can be controlled via the valve 86. Further, the strength (pressure), timing, and duration of those pulses are controllable and can be determined based on parameters such as type of seed, desired seed spacing in the furrow, speed of the planter, and other conditions related to the planter and its movement in the field. Further, in certain embodiments, the pulse duration and pressure can be controlled to match the ground speed of the planting unit, thereby providing the ability to control the exit speed of the seed. Ejecting the seed backward at the equal and opposite speed of the planter results in zero net ground speed of the seed, thereby allowing it to drop straight down into the furrow and eliminating seed tumbling in the furrow, thus eliminating a source of seed spacing variation.

In one embodiment, the metering housing 82 can have the following specific, non-limiting characteristics for purposes of metering corn or soybean seeds as set forth in Table 1 below. It is understood that these same characteristics can be accurate for any known system embodiment as disclosed or contemplated herein. It is further understood that these characteristics are estimates and should be read as being "about" the amounts set forth therein. In addition, they are not intended to be limiting and that other characteristics that fall outside the dimensions set forth below that optimize or maintain effective operability of any embodiment herein are contemplated as well. With respect to the launching position diameter, in addition to the dimensions provided below in Table 1, it is understood that the diameter can be any size that is smaller than the diameter of the seed such that the seed cannot pass through the opening at the launching position.

TABLE 1

| FEATURE | DIMENSIONS |
| --- | --- |
| Launching Position Diameter | .1 to .25 inches |
| Air Source Pressure | 20 to 60 psi |
| Pulse Frequency | 5 to 40 Hz |
| Pulse Duration | 5 to 50 ms |

Thus, it is clear that various control parameters influence the effectiveness of those systems. Parameters such as pressure of the controlled air pulses, duration of each air pulse, spacing between the air pulses (in both time and frequency), all of which are discussed above, must be optimized to ensure that the various systems herein are operable and effective. As such, all of the various implementations disclosed or contemplated herein allow for each of the control parameters discussed above and any other such parameters to be adjustable to optimize seed spacing and speed, either manually or automatically via a real-time feedback control system that will be discussed in further detail below. For example, feedback can be provided in various embodiments herein via seed count sensors, seed presence sensors, or the like, as will be detailed below.

As shown in FIG. 3, the seed chamber 96 and ejection lumen 100 are substantially parallel with the horizon H. Alternatively, the chamber 96 and lumen 100 can be disposed at an angle in relation to the horizon H. Other embodiments can include a chamber 96 and lumen 100 that are disposed at 45 degrees or greater, up to and including 90 degrees (vertical) in relation to the horizon H, as will be described in further detail with respect to an alternative embodiment below.

In certain embodiments, each separate system (such as system 80) on each separate row unit (such as row unit 14 or 50) can be individually and/or independently controlled as to one or more parameters, as will be discussed in further detail below. As such, desired seed spacing, planter ground speed, planter turning radius, inlet air pressure, and desired seed exit velocity are a few nonlimiting examples of parameters that can be independently controlled at separate row units. Additionally, feedback such as seed count, seed exit velocity, and/or seed presence/proximity at the launching position of each seed metering housing could also be used.

The seed metering system 80—and most of the various additional embodiments disclosed or contemplated herein—has few moving or active components. More specifically, in this specific implementation, the only active component is the valve 86 that is actuated to move between open and closed configurations to provide the controlled air pulses. Given the minimal number of active components and the minimal number of components generally, it is understood that various system embodiments as contemplated herein are fairly small by comparison to known high-speed metering systems. Further, because of the small size of the system, it is also possible to add additional components or systems to the planter such that, for example, two or more metering systems or two or more hoppers (each containing a different type of seed) can be added to each row unit and thereby provide for the ability to easily select and change the seed variety in real time while in the process of planting.

It is also understood that the dimensions and exact specifications of the seed metering housing and its components can vary depending on the type and size of the seed to be planted. For example, corn and soybean seed sizes are typically in the range of about 0.25 to about 0.5 inch (but are not limited thereto), and the dimensions of the various components of the system embodiments disclosed or contemplated herein can be sized to accommodate such seeds.

The various components of the housing 82 can be constructed or formed of any combination of metals, metal alloys, thermoplastics, or ceramics. Alternatively, any other known materials can be used. The various lumens and other internal paths and/or features can be formed via any methods or procedures known to those of skill in the art. For example, for components comprised of metals or alloys thereof, a machining process such as drilling or boring can be used to form the various lumens or other such features. Alternatively, for components comprised of thermoplastics or the like, any known process such as machining or molding can be used. In a further alternative, 3-D printing or some other known fabrication technique could be used to produce the internal and external configuration of the housing 82. Further, it is understood that any embodiment disclosed or contemplated herein can be made of the same or similar materials using the same or similar processes.

It is understood that any of the specific components and/or features of the seed metering system 80 as depicted in FIG. 3 and discussed above can be incorporated into any of the other various seed metering embodiments disclosed or contemplated herein. It is also understood that any other components or features disclosed or contemplated in any other embodiment herein can be incorporated into the system 80 described above.

Figure 4:
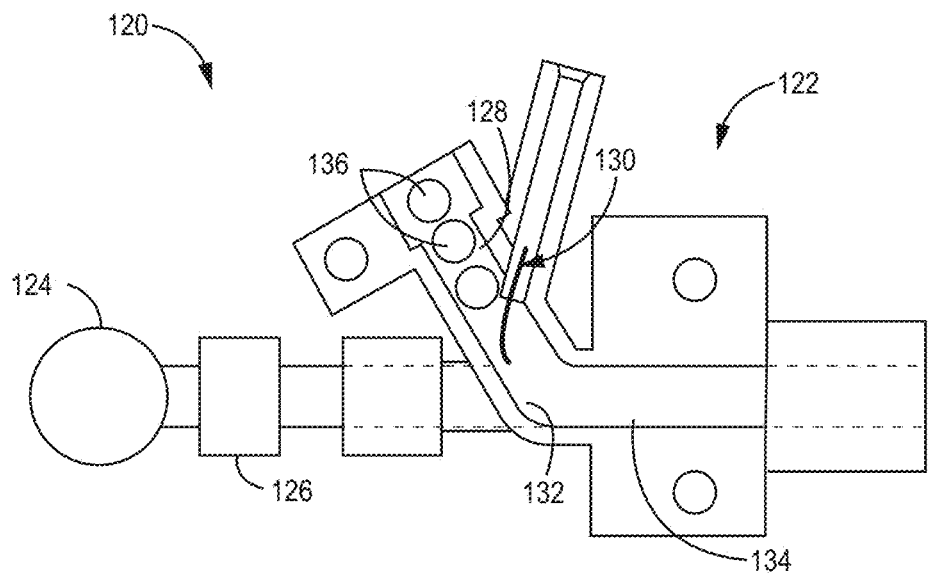
FIG. 4 is a cross-sectional, partial cutaway view of another seed metering system, according to a further embodiment.

Another embodiment of a controlled air pulse seed metering system 120 is depicted in FIG. 4. Like the system 80 discussed above, this system 120 includes a metering housing 122, an air source 124, and a valve 126. It is understood that the various components of the metering housing 122 are substantially similar or identical to the equivalent components of the housing 82 discussed above and thus will not be discussed in any detail herein, except with respect to those components in the housing 122 that are different or new. In this implementation, the seed retention structure 130 is disposed within the seed receiving lumen 128 such that it is upstream of the seed positioning location 132, rather than being disposed within the seed chamber 134 like the retention structure 102 in system 80 as discussed above. Thus, the seed retention structure 130 temporarily retains the seeds 136 within the seed receiving lumen 128 at a location upstream from the launching position 132.

As such, in this implementation, the seed retention structure 130 applies sufficient force against the seeds 136 or has sufficient rigidity to resist or overcome the force of gravity applied to the seeds 136 and thereby retain the seeds 136 in the seed receiving lumen 128 when the only force being applied to the seeds 136 is gravity. However, when the controlled air pulse is discharged by the air source 124 via the valve 126 such that the previous seed (not shown) is ejected from the launching position 132, the venturi effect is created at the launching position 132, as described in further detail above. In this embodiment, the additional force of the venturi effect is sufficient to overcome the force applied by the retention structure 130, thereby causing the seed 136 to be urged past the retention structure 130 and into the seed positioning location 132. At this point, the seed is positioned to be ejected via a controlled air pulse.

The retention structure 130 in this embodiment is substantially similar to the structure 106 discussed above (other than its location within the housing 122) and thus can be a flap 130 or any other structure or configuration as described in further detail with respect to system 80 and operate in a fashion similar to that described with respect to that structure 106.

It is understood that any of the specific components and/or features of the seed metering system 120 as depicted in FIG. 4 and discussed above, including the unique positioning and operation of the retention structure 130, can be incorporated into any of the other various seed metering embodiments disclosed or contemplated herein. It is also understood that any other components or features disclosed or contemplated in any other embodiment herein can be incorporated into the system 130 described above.

Figure 5:
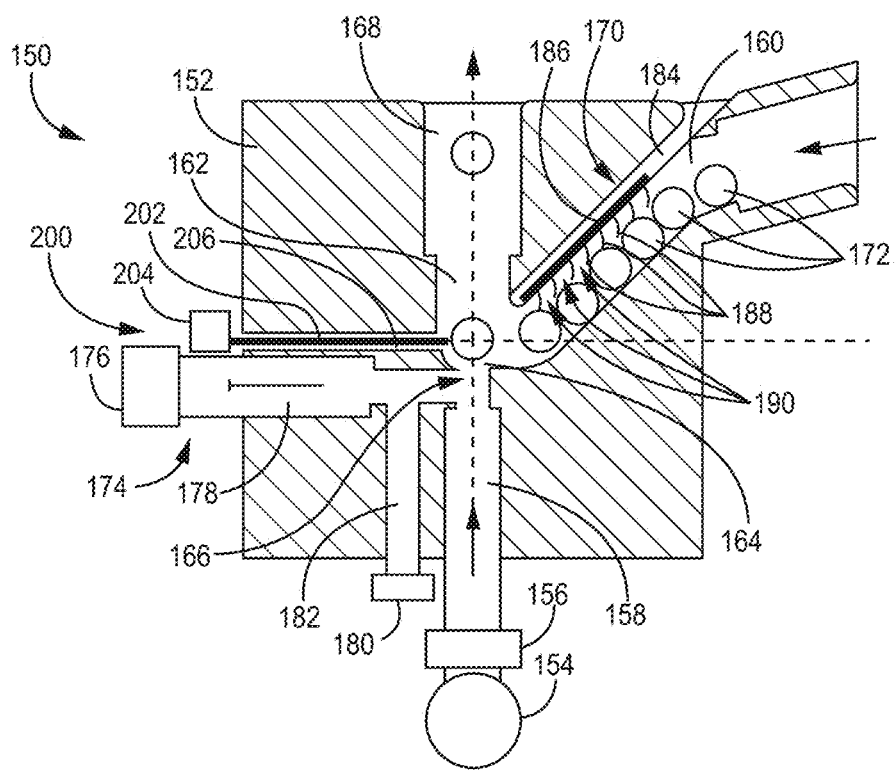
FIG. 5 is a cross-sectional, partial cutaway view of another seed metering system, according to another embodiment.

A further implementation of a seed metering system 150 according to another embodiment is depicted in FIG. 5. The system 150 has a metering housing 152, an air source 154, a valve 156, an air intake lumen 158 coupled to the air source 154 and valve 156, a seed receiving lumen 160 that is coupleable to a seed feeding tube (not shown) (which can be any feeding tube as disclosed in any embodiment herein), and a seed chamber 162 with a seed positioning location 164 and a seed ejection lumen 168 extending from the chamber 160 as shown. Further, a seed retention structure 170 is disposed within or adjacent to the seed receiving lumen 160. In addition, the pressurized air source 154 is in fluidic communication with the seed chamber 162 via the valve 156 and the air intake lumen 158, and, more specifically, via the opening 166 that is defined between the air intake lumen 158 and the chamber 162 and adjacent to the seed positioning location 164.

It is understood that the various components of the system 150 are substantially similar or identical to the equivalent components of the systems 50, 80, 120 discussed above and thus will not be discussed in any detail herein, except with respect to those components of system 150 that are different or new in comparison to those previously-described systems.

In this implementation, the air intake lumen 158 and the seed chamber 162 are disposed vertically (at an angle of about 90 degrees in relation to the horizon) such that the seed 172 at the seed positioning location 164 is ejected vertically out of the housing 152 through the ejection lumen 168. Thus, in one embodiment, it is understood that the air intake opening 166 disposed adjacent to the seed launching position 164 has a diameter that is smaller than the diameter of the seeds 172 such that any seed 172 can rest on or over the air intake opening 166 without risk of the seed 172 dropping or otherwise passing through the opening 166 and into the air intake lumen 158 as a result of gravity.

In accordance with one embodiment, the vertical disposition of the air intake lumen 102 and the seed chamber 96 results in the controlled pulse of air being discharged upwardly through the air intake lumen 102 and thereby ejecting the seed 172 from the launching position 164 upward against gravity. This vertical configuration provides assistance with the positioning of the seed 172 in the seed positioning location 164. That is, the configuration utilizes gravity to help retain the seed 172 in the desired location in the seed positioning location 164, thereby reducing or eliminating the need for any other mechanisms, features, or methods for retaining or locating the seed 172 in the appropriate location (the seed positioning location 164). It is understood that despite the vertical orientation of the intake lumen 102 and seed chamber 96, the ejection of seeds from the seed positioning location 164 operates in the same fashion as all the other metering system embodiments herein, including the added benefit of the venturi effect in accordance with some implementations.

According to the exemplary embodiment of FIG. 5, the seed retention structure 170 is a set of bristles (also referred to herein as a "brush") 170 that are disposed along one wall of the seed receiving lumen 160 and extend along a length of that wall as shown. Each bristle of the brush 170 can extend some distance toward the opposite wall of the lumen 160 such that each seed 172 that passes through the lumen 160 makes contact with all or most of the bristles of the brush 170. In this embodiment, the brush 170 can be configured to restrain or slow the seeds 172 as they pass through the seed receiving lumen 160. Alternatively, the brush 170 can be configured to stop the seeds 172 in the lumen 160. In such an embodiment, the distal-most seed is ultimately urged toward and into the seed positioning location 164 by a force that overcomes the force of the bristles of the brush 170, which, in one implementation, is the venturi effect acting in conjunction with the brush 170 in a fashion similar to the venturi effect and the retention structure 170 in the system 120 discussed above.

In certain implementations, a lumen (or channel or bore) 184 is defined in the housing 152 to provide access for positioning the brush 170 into the housing 152 and, more specifically, into the seed receiving lumen 160 as shown. More specifically, the elongate member 186 of the brush 170 can be inserted into the lumen 184 such that the bristles 188 coupled to the elongate member 186 can extend through openings 190 defined within the wall of the lumen 184. The openings 190 provide fluidic communication between the lumen 184 and the seed receiving lumen 160 such that the bristles 188 can extend therethrough. Due to the fluidic communication between the two lumens 160, 184, a plug or other type of fluidic sealing device (not shown) can be positioned over the external opening of the lumen 184 to provide a fluidic seal between the internal lumens of the housing 152 and the external, ambient air, thereby providing better control of the internal pressure within the lumens of the housing 152, including especially the seed chamber 162.

Alternatively, the retention structure 170 can be any structure and can be positioned at any location within the housing 152 as disclosed or contemplated according to any embodiment herein.

The system 150, in accordance with one specific implementation, can have a vacuum component 174 that is fluidically coupled to the seed positioning location 164 such that the vacuum component 174 can be optionally used to further control the positioning of the seed 172 within the housing 152. The vacuum component 174 has a vacuum source 176, and a vacuum lumen 178 that is coupled to the vacuum source 176 while also being in fluidic communication with the seed positioning location 164. In use, the vacuum source 176 can be actuated to create a vacuum that results in the creation of a vacuum at the seed positioning location 164, thereby urging a seed 172 in the seed receiving lumen 160 to move toward and into the seed positioning location 164 in a controlled and/or orderly fashion. In addition, the vacuum component 174 can also be used to retain the seed 172 in place at the seed positioning location 164.

In accordance with a further embodiment, the system 150 can have a pressure sensor 180 that is fluidically coupled with the seed positioning location 164. More specifically, the pressure sensor is fluidically coupled to a pressure sensor lumen 182 that is in fluidic communication with the vacuum lumen 178, which is in fluidic communication with the seed positioning location 164. In one implementation, the sensor 180 can monitor pressures in the seed chamber 162. Alternatively, the system 150 and any other system embodiment can have no pressure sensor.

Another optional component that can be incorporated into the system 150 (or any other system disclosed or contemplated herein) is a seed positioning device 200 as depicted in FIG. 5, according to one implementation. The seed positioning device 200 in this specific exemplary embodiment is a deployable rod (or pin) 202 that is coupled to an actuator 204 and is disposed in the rod lumen 206. The rod lumen 206 is defined in the device housing 152 such that the lumen 206 is in fluidic communication with the seed chamber 162. The rod 202 is slidably disposed within the lumen 206 such that the rod 202 can extend into the seed chamber 162 at the seed positioning location 164 such that the rod 202 can contact the seed 172 disposed therein. Further, the rod 202 can also be retracted into the lumen 206 such that the rod 202 is not in contact with the seed 172. The actuator 204 is actuated to move the rod 202 between an extended position, a retracted position, or any position therebetween. That is, the rod 202 can be urged into any position in relation to the seed 172 and/or the seed positioning location 164 such that the distal end of the rod 202 can be used to better position the seed 172 in the seed positioning location 164. In one implementation, the actuator 204 can be actuated manually or automatically to position the rod 202 as desired. According to certain embodiments, the seed positioning device 200 can be used to better position each seed 172 separately to adjust for the unique size or shape of each such seed 172. Alternatively, the seed positioning device 200 can be set at a particular position for a particular type of seed (soybean, corn, or some other type of seed, for example). Regardless, the rod 202 can be used to position the seed 172 in any desirable fashion, such as closer to one side or the other of the chamber 162, which can influence how the controlled pulse of air ejects the seed 172 from the chamber 162. It is understood that the rod lumen 206 can be fluidically sealed from the ambient air outside the device housing 152.

In a further alternative, the seed positioning device 200 can be another structure or component other than a rod. For example, the seed positioning device 200 can be a plate or other type of planar surface. In another example, the device 200 in one embodiment can be a flexible wall or balloon-like structure (not shown) that can be actuated to change its shape and thereby extend into the seed chamber in a fashion similar to the rod 202 to contact the seed 172 and thus position the seed 172 in the seed positioning location 164 in any desired fashion. The wall or balloon-like structure, according one embodiment, can be made of a semi-flexible or flexible material that allows it to change its shape and/or geometry. In use, an external force is applied to the wall or balloon-like structure to cause it to change it shape or size and thereby position the seed 172 in the seed positioning location 164 as desired. Further, like the rod 202 discussed above, the actuator coupled to the wall or balloon-like structure can be actuated manually or automatically. In one implementation, the seed positioning device 200 can be used to physically retain the seed 172 in place in the seed positioning location 164 until the controlled air pulse occurs.

It is understood that any of the specific components and/or features of the seed metering system 150 as depicted in FIG. 5 and discussed above can be incorporated into any of the other various seed metering embodiments disclosed or contemplated herein. It is also understood that any other components or features disclosed or contemplated in any other embodiment herein can be incorporated into the system 150 described above.

Figure 6:
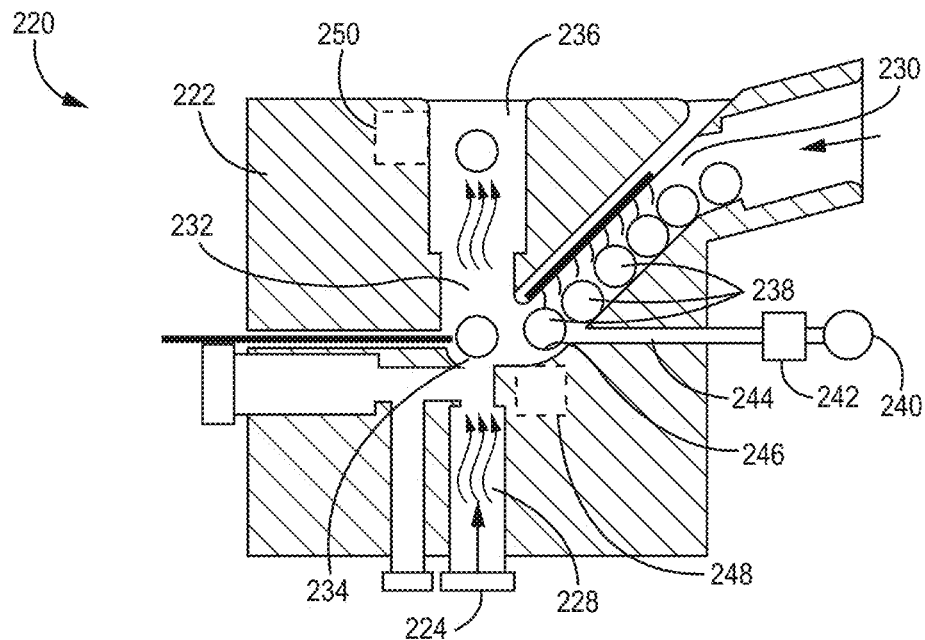
FIG. 6 is a cross-sectional, partial cutaway view of another seed metering system, according to yet another embodiment.

Yet another embodiment of a seed metering system 220 is depicted in FIG. 6. The system 220 has a metering housing 222, an air source 224, an air intake lumen 228, a seed receiving lumen 230 that is coupleable to a seed feeding tube (not shown) (which can be any feeding tube as disclosed in any embodiment herein), and a seed chamber 232 with a seed positioning location 234 and a seed ejection lumen 236 extending from the chamber 232 as shown. In this embodiment, the housing 222 also has a seed holding chamber (or seed holding location) 246 disposed at a distal end (or bottom) of the seed receiving lumen 230 and adjacent to the seed positioning location 234. Like the system 150 discussed above, the air intake lumen 228 and the seed chamber 232 are disposed vertically such that the seed 238 at the seed positioning location 234 is ejected vertically out of the housing 222 through the ejection lumen 236.

It is understood that the various components of the system 220 are substantially similar or identical to the equivalent components of the systems 50, 80, 120, 150 discussed above and thus will not be discussed in any detail herein, except with respect to those components of system 220 that are different or new in comparison to those previously-described systems.

In this embodiment, the system 220 utilizes a combination of (1) a steady stream of low pressure air from one air source and (2) low pressure air pulses from another air source. More specifically, the first air source 224 is a lower pressure air source 224 that provides a steady, continuous stream of low pressure air through the air intake 228 and the seed chamber 232. According to one implementation, the first air source 224 is a blower-style fan 224 or any other known low pressure air source. In one embodiment, the first air source 224 provides the steady stream of air at a pressure ranging from about 0.5 to about 5 psi.

Separately, a second low pressure air source 240, a valve 242, and an air intake lumen 244 coupled to the air source 240 and valve 242. The second low pressure air source 240 is in fluidic communication with the seed chamber 232, and more specifically with the seed holding chamber 246, via the valve 242 and the air intake lumen 244 such that the lower pressure air source 240 can provide intermittent, low pressure pulses of air pulse (in contrast to the high pressure air pulses in the previous embodiments discussed above) via valve 242 and through the lumen 244 to the seed 238 disposed in the seed holding chamber 246. In one embodiment, the valve 242 provides the intermittent, timed low pressure pulses of air from the second air source 240 at a pressure ranging from about 10 to about 20 psi. As such, according to one implementation, the second air source 240 can also be a blower-style fan 240 or any other known low pressure air source.

According to one embodiment, the pulse of air from the second air source 240 is discharged via valve 242 and through the air intake lumen 244 to urge a seed 238 disposed in the seed holding chamber 246 into the seed positioning location 234. As such, the seed 238 thus becomes positioned in the steady stream of air flowing through the seed chamber 232 that is provided by the first air source 224, thereby causing the seed 238 to be urged out of the seed chamber 232 and into the seed delivery system (not shown) coupled thereto. In one embodiment, this steady stream of air can be utilized to urge the seed 238 out of the seed ejection lumen 236 and along a seed tube (not shown) of a known seed delivery apparatus to the distal end of the tube and into the seed furrow in the soil (not shown). Alternatively, the seed chamber 232 and ejection lumen 236 can be coupled to any known seed delivery system in a fashion similar to any of the seed metering systems disclosed or contemplated herein.

As such, in the specific exemplary embodiment of the system 220, the seed 232 is urged from the seed holding chamber 246 into position on the seed positioning location 234 by an air pulse from one air source 240 and then is ejected from the seed metering system 220 by a steady air stream from another air source 224. This is in contrast to having the single pulse of high pressure air provide the timing and transport of the seed from the seed metering system according to other system embodiments disclosed or contemplated herein, including those described above.

Alternatively, it is understood that the air source 240 can be a high pressure air source 240 such that a high pressure pulse of air is discharged through the air intake lumen 244. In a further alternative, the air source 224 can be a high pressure air source (and be coupled to a valve). It yet another alternative, any combination of air sources of any known type can be used in this system 220.

In the exemplary embodiment of FIG. 6, the system 220 also has two optional sensors 248, 250 disposed in or on the metering housing 222. More specifically, an optional seed presence sensor 248 is disposed at a location substantially adjacent to the seed positioning location 234 such that the sensor 248 can detect when a seed 238 is disposed at the seed positioning location 234. Alternatively, the presence sensor 248 can be positioned to detect the presence of a seed 238 at a location near the seed positioning location 234 or at any other location within the housing 222 at which seeds are expected to be present. Further, the system 220 can also have a seed count sensor 250 disposed at a location substantially adjacent to the seed ejection lumen 236 such that the sensor can detect each seed 238 that passes through the ejection lumen 236 as it is ejected from the housing 222 and "count" each such detection by summarizing or accumulating the total number of detections. Alternatively, the seed count sensor 250 can be positioned to detect and tally the passage of each seed 238 at any location along the seed chamber 232 or at any other location within the housing 222 through which the seeds are expected to pass.

Either or both of the sensors 248, 250 can be known electrical or electronic commercially-available sensors. Sensor examples (for either or both sensors 248, 250) include optical interruption sensors, proximity sensors, electromechanical sensors such as a leaf switch sensor, or any other known sensor that can be used for the intended purposes described herein. Further, both sensors 248, 250 are coupled to a processor (not shown) associated with the system 220 such that each sensor 248, 250 can communicate the detections to the processor such that the system 220 can track or confirm the presence of a seed 238 at certain desired locations and times within the system 220. A more detailed discussion of processors in the context of the various system embodiments herein is provided below. According to a further embodiment, both sensors 248, 250 can be used in combination to estimate seed exit velocity, including, for example, for feedback control of the seed velocity.

It is understood that any of the specific components and/or features of the seed metering system 220 as depicted in FIG. 6 and discussed above can be incorporated into any of the other various seed metering embodiments disclosed or contemplated herein. It is also understood that any other components or features disclosed or contemplated in any other embodiment herein can be incorporated into the system 220 described above.

Figure 7:
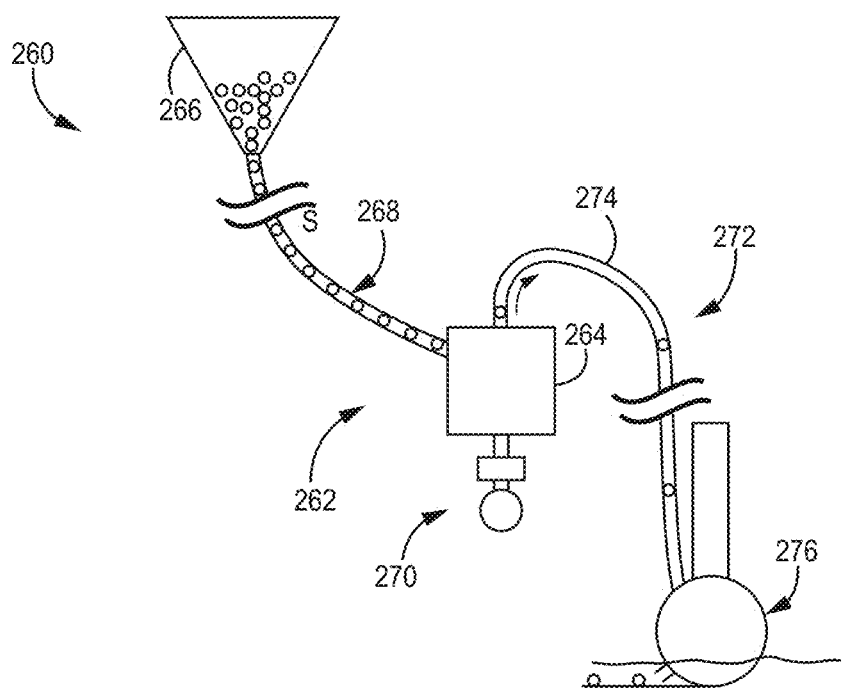
FIG. 7 is a schematic view of a row unit with a seed metering system, according to another embodiment.

Another diagrammatic depiction of a controlled air pulse seed metering system 262 incorporated into a row unit 260 according to one embodiment is shown in FIG. 7. It is understood that the various components of the row unit 260 and metering system 262 are substantially similar or identical to the equivalent components of the row unit 50 and system 30 in FIG. 2 and discussed above and thus will not be discussed in any detail herein, except with respect to those components of row unit 260 that are different or new in comparison to the previously-described embodiment.

In this embodiment, the system 262 includes metering housing 264 that has a vertical seed ejection configuration similar to housings 152, 222 as discussed above. As such, while the seed hopper 266 and the seed feeding tube 268 are disposed in a similar fashion to their equivalent counterparts in the embodiment of FIG. 2, the air source and valve 270 are disposed below the seed metering housing 264 to provide the controlled air pulses upward toward the vertical configuration and the seed delivery tube 274 of the seed delivery apparatus 272 extends from the top of the housing 264 to the furrow opening disks 276. This configuration of the row unit 260 accommodates a housing 264 with a vertical configuration of the controlled air pulses, as mentioned above. However, other than the differences described above with respect to the disposition of the components, the remaining components and features and functionality thereof remain identical or substantially similar to the corresponding components discussed above with respect to row unit 50 and any other embodiments disclosed or contemplated herein.

It is understood that any of the specific components and/or features of the row unit 260 and seed metering system 262 as depicted in FIG. 7 and discussed above can be incorporated into any of the other various seed metering embodiments disclosed or contemplated herein. It is also understood that any other components or features disclosed or contemplated in any other embodiment herein can be incorporated into the row unit 260 and system 262 described above.

Figure 8:
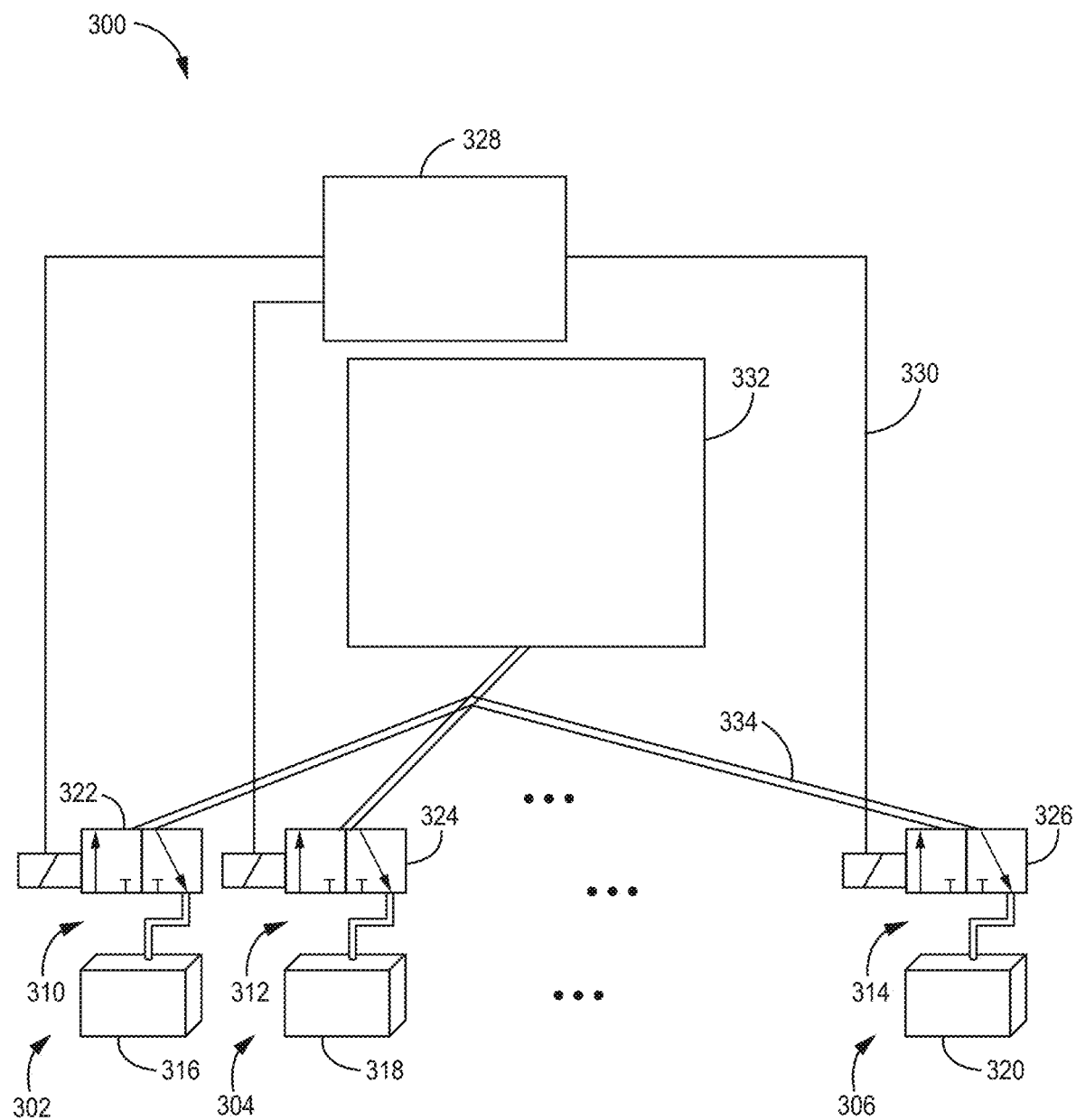
FIG. 8 is a schematic view of a planting system, according to one embodiment.

FIG. 8 depicts a schematic embodiment of a planting implement 300 with multiple row units 302, 304, 306, where the total number of row units can vary from four to 48 or more, depending on the size of the planter 300. As discussed elsewhere herein, each row unit 302, 304, 306 has a metering system 310, 312, 314 that includes a metering housing 316, 318, 320 and a valve 322, 324, 326, according to any of the implementations disclosed or contemplated herein. In this implementation, a single air source 332 is provided on the planting unit 300 that is coupled via air lines 334 to each of the valves 322, 324, 326 on the row units 302, 304, 306. Alternatively, a separate air source can be provided for each metering system 310, 312, 314. The air source 332 (or sources) can be a high-pressurized air source or a low-pressure air source. Further, the planter 300 has a programmable controller 328 that can be disposed on the implement 300 or, alternatively, in the tractor (not shown) that pulls the implement 300. The controller 328 is coupled to each of the metering systems 310, 312, 314 via the electrical connections 330 as shown. In certain embodiments, the controller 328 can be coupled to or otherwise in communication with a known precision agriculture system associated with the tractor (not shown). It is understood that any electrical power necessary to power the controller 328 and the metering systems 310, 312, 314 can be provided by the tractor's on-board system (not shown), according to one embodiment. Alternatively, a known battery or other electrical power source can be provided on the planter 300 or elsewhere.

Figure 9:
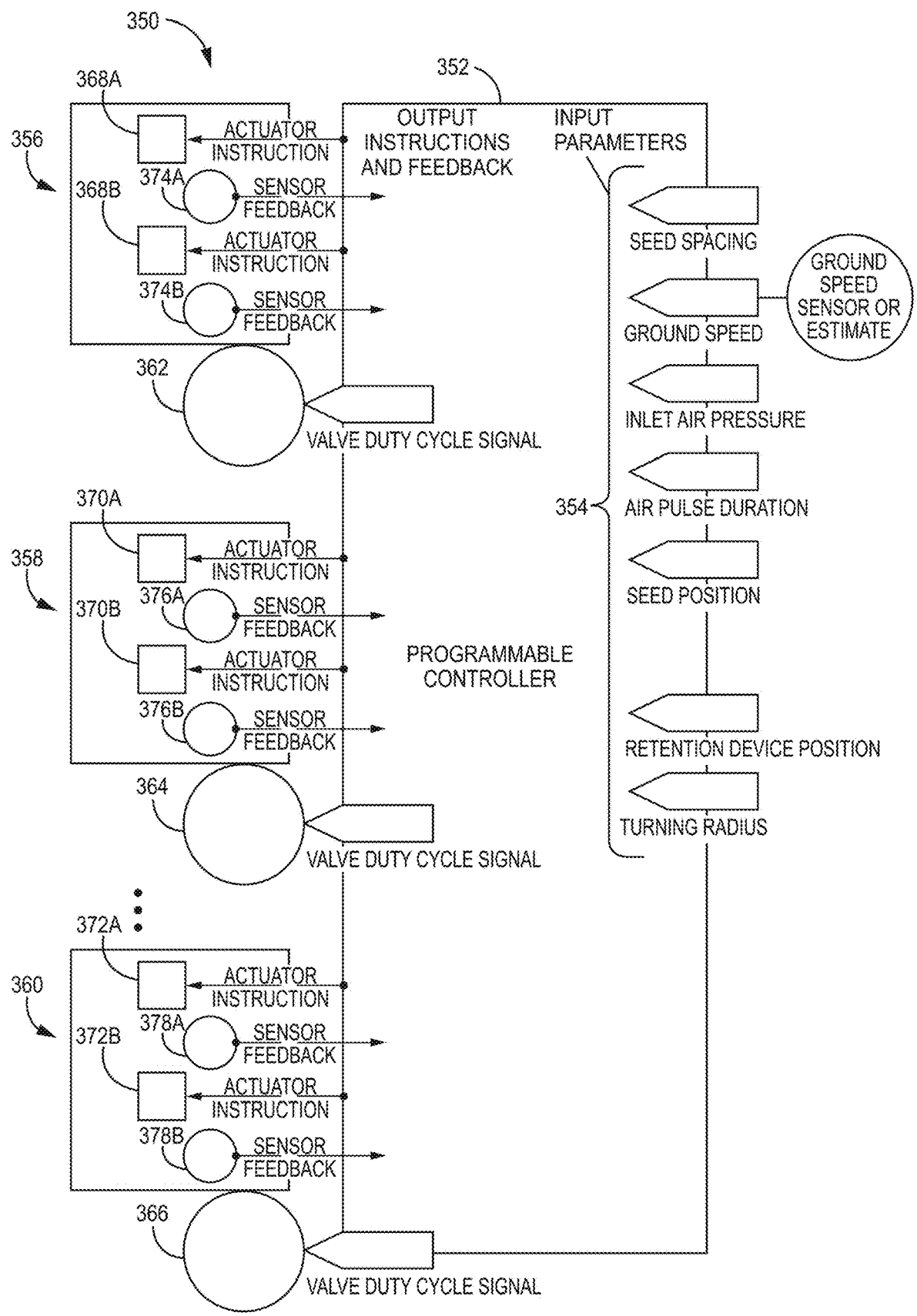
FIG. 9 is a schematic view of a control system for a planting system, according to one embodiment.

One schematic depiction of a control system 350 for a planting unit with metering systems according to the various embodiments herein is shown in FIG. 9, according to one embodiment. The system 350 has a programmable controller 352 that can be identical to or substantially similar to the controller 328 discussed above with respect to FIG. 8 or any other known controller for implementation into a planter having metering systems according to the various embodiments disclosed or contemplated herein. The programmable controller 352 can be configured to receive a variety of input parameters 354 relating to the operation of the planting unit (such as unit 300, for example). A non-limiting exemplary list of such inputs 354, according to one embodiment, are shown in FIG. 9. Additional parameters can include calculations based on the collected inputs 354, such as, for example, a calculation of seed spacing desired at each row unit. Further, additional parameters can be available from a known precision ag system, which could be provided in the tractor pulling the planting unit.

It is understood that the controller 352 in this embodiment (and any other embodiment) can be any known processor for use in agricultural equipment or have any such processor incorporated therein. In certain implementations, the controller 352 can be programmed according to selected parameters to control operation of each metering system on each row unit independently and/or in real time.

In certain implementations, the controller 352 is electronically and/or electrically coupled to each seed metering system 356, 358, 360 (which can be any number of systems up to the number of row units in the planting unit) and the separate components thereof, including, for example, the valves 362, 364, 366. The controller 352 can transmit control instructions (such as actuator instructions) to the various controllable components on each metering system 356, 358, 360 (including the valves 362, 364, 366). For example, the controller 352 can transmit instructions to the actuators 368A, 368B, 370A, 370B, 372A, 372B on each individual metering system 356, 358, 560. The actuators 368A-372B can be any known actuators for any known component of any of the various metering systems described above, such as the seed retention structures, the seed positioning devices, the pressure sensors, the vacuum devices, or any other known components that can be operated via the controller 352.

Further, according to some embodiments, the controller 352 can receive feedback/information from various sensors or other information-collecting components on each seed metering system 356, 358, 360, including exemplary sensors 374A, 374B, 376A, 376B, 378A, 378B. According to one embodiment, the sensors 374A-378B are seed presence and seed count sensors similar or identical to the sensors described above with respect to FIG. 6, thereby providing seed presence, seed count, seed spacing, or seed velocity information. Alternatively, the feedback can be any information that can come from any known component that can provide information to the controller 352.

Based on the parameters 354 and/or the feedback, the processor 352 can assimilate the information and transmit instructions to the actuators 368A-372B to adjust such parameters as retention device position, positioning device position, air pulse duration, inlet air pressure, or any other such parameters. It is understood that any control-related feedback and actuation relating to the various metering systems is contemplated herein. Further, the controller 352, based on the various input parameters 354 programmed into the controller 352, transmits instructions to the valves 362, 364, 366 relating to the desired timing, magnitude, or other characteristics of the controlled air pulses for each metering system 356, 358, 360. In one embodiment, the instructions can each take the form of an electrical signal having a pulse width modulation ("PWM") or any other known form that can be used to send instructions to the valves 362, 364, 366.

It is understood that the control system 350 is easily adjustable by programming the controller 352 to adjust any operation parameters as desired.

Figure 10:
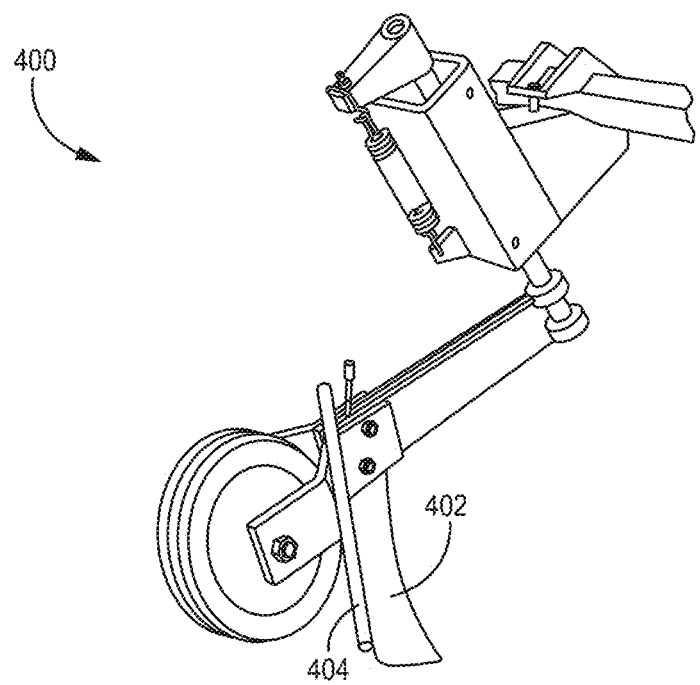
FIG. 10 is a perspective view of a seed delivery apparatus, according to one embodiment.

Any of the seed metering systems according to any of the implementations disclosed or contemplated herein make it possible to utilize a variety of seed delivery systems in the planting units in which the seed metering systems are incorporated. For example, in one embodiment as best shown in FIG. 10, instead of a seed delivery apparatus having furrow opening disks as previously described in embodiments discussed above, any seed metering system embodiment disclosed or contemplated herein can be coupled with the seed delivery apparatus 400, which has a furrow opening tool 402 that is a knife (or "chisel") device 402 that can form a seed furrow while reducing costs and tractor horsepower requirements. In this implementation, the seed delivery tube 404 can be positioned proximally of the knife device 402 in relation to the planting unit's direction of operation.

Figure 11A:
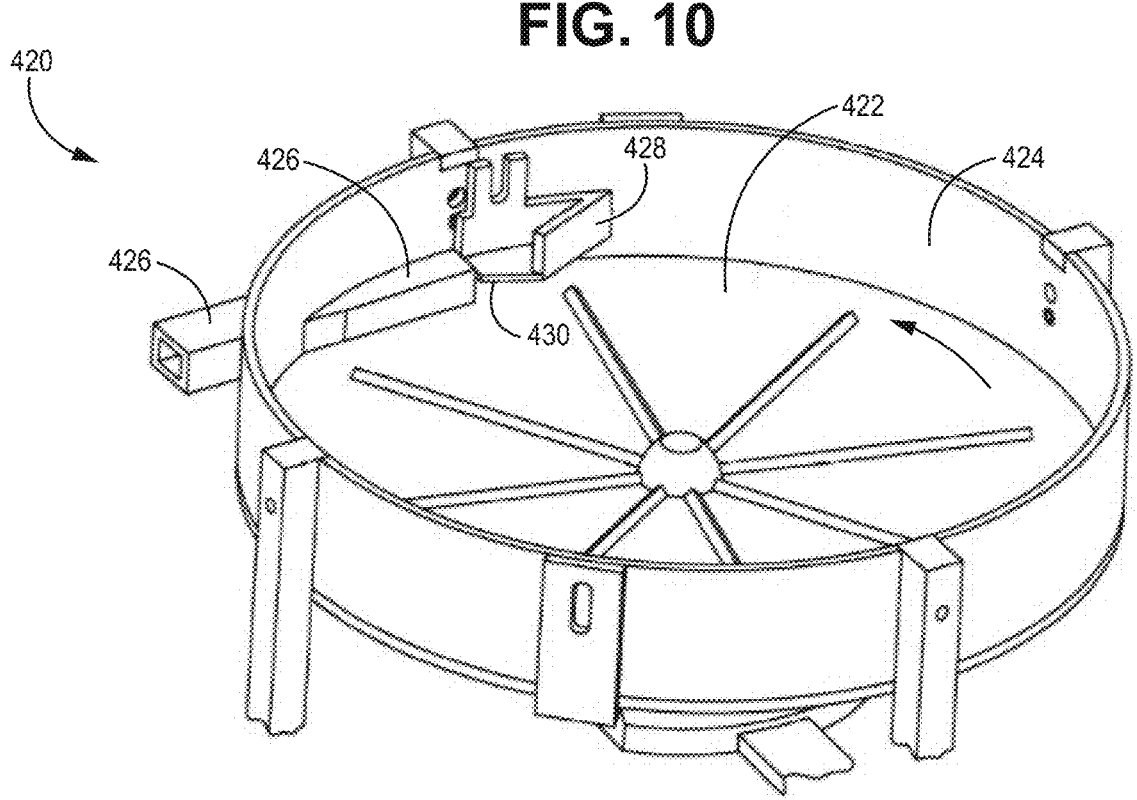
FIG. 11A is a perspective view of a seed singulation device, according to one embodiment.
Figure 11B:
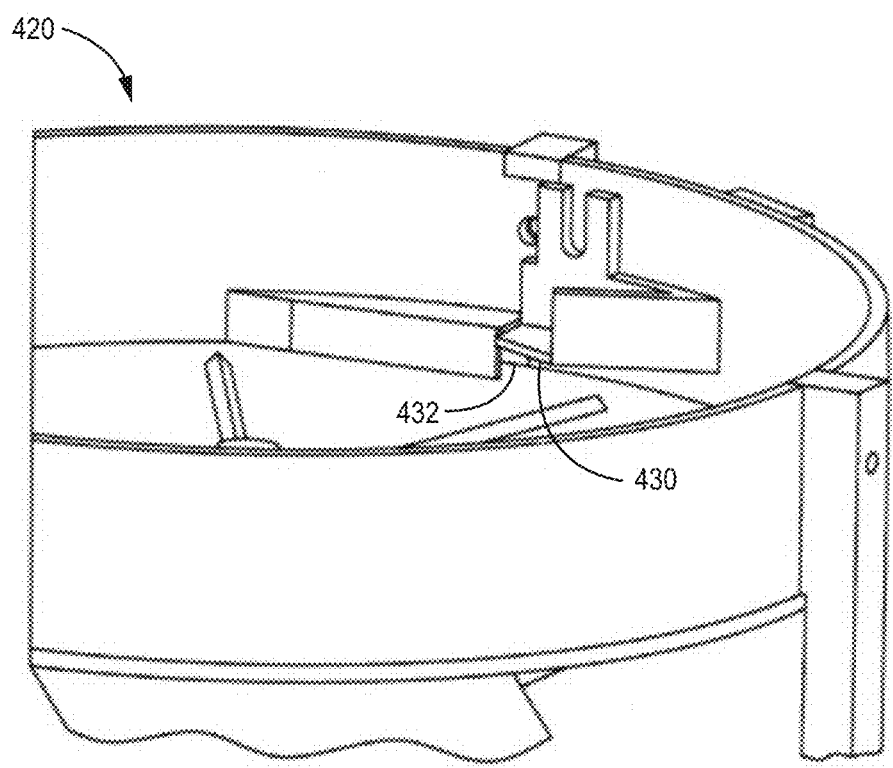
FIG. 11B is a perspective view of a portion of the seed singulation device of FIG. 11A, according to one embodiment.
Figure 11C:
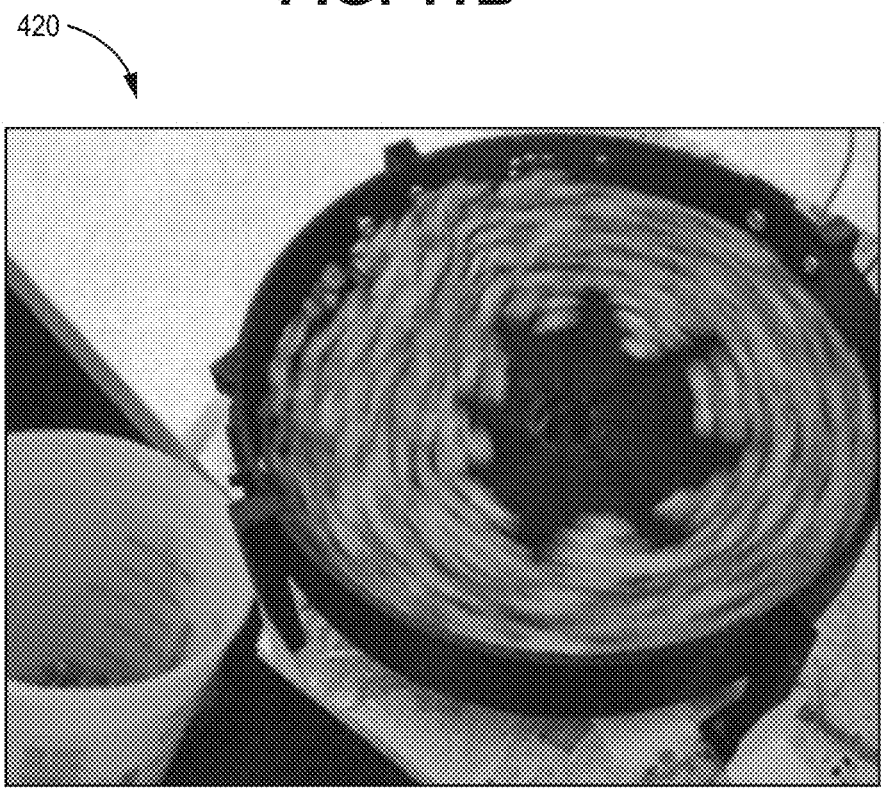
FIG. 11C is a perspective view of the seed singulation device of FIG. 11A in use, according to one embodiment.

As mentioned above with respect to FIG. 2, the various row unit embodiments disclosed or contemplated herein can also have a seed singulation device 62. One exemplary implementation of such a seed singulation device 420 is depicted in FIGS. 11A-11C, which can be used to feed seed from a hopper (such as hopper 52 above) to a seed metering system (such as system 30 or any other such system herein) in a singulated manner.

It is understood that planting unit and seed metering systems require a transition from a bulk seed quantity to a substantially singulated feed of seeds into such metering systems in a serial, single-file fashion. The singulation device 420 receives seed in bulk form from a seed hopper and separates the seeds into a single-file line thereof, and further can have a variable speed output such that the speed of the single-file seed supply can match the seed flow rate of the seed metering system.

In one embodiment, the seed singulation device 420 is a spinning disk 422 having a seed retaining wall 424 such that the disk 422 can be rotated to cause the seeds disposed thereon to be urged toward the outer circumference of the disk 422 and thereby toward the retaining wall 424. In one embodiment, the retaining wall 424 is stationary while the disk 422 is rotated. Further, the device 420 has a seed exit lumen 426 that is located along and attached to the seed retaining wall 424 such that the lumen 426 extends from an interior of the retaining wall 424 to an exterior thereof, as shown. As best depicted in FIG. 11B, the opening 432 of the lumen 426 within the interior of the device 420 is disposed adjacent to the retaining wall 424 such that seed is urged toward the opening as the disk 422 is rotated. The lumen 426 is sized such that the inner diameter is the same size or larger than the diameter of any seed to be disposed therethrough such that only one seed at a time can enter the lumen 426. That is, according to one embodiment, the cross-sectional size and shape of the lumen 426 is designed according to the size and shape of the seed to be fed through the lumen 426. For example, a rectangular cross-section is effective when handling flat corn seeds while a circular cross-section is effective with round corn or soybeans. Alternatively, any known cross-sectional size and shape that allows for passage of the desired seeds can be used.

The device 420 also has a flange (or projection) 428 attached to the inner wall of the retaining wall 424 can help to urge accumulated seeds along the retaining wall 424 away from the opening of exit lumen 426, which can help to prevent a congestion of seeds at the opening of the lumen 426 that could prevent seeds from entering the lumen 426. That is, the angled contact surface of the flange 428 urges the seeds away from the retaining wall 424 as the seeds are urged toward the opening of the lumen 426 as the disk 422 is rotated. In addition, in certain embodiments, the flange 428 also has a ceiling 430 disposed at a predetermined distance above the disk 422 and extending from the contact surface of the flange 428 to the opening in the exit lumen 426 such that the clearance between the disk 422 and the ceiling 430 permits only one seed to be disposed between the disk 422 and the ceiling 430. As such, the ceiling 430 allows only single seeds to pass below the flange 428 while rejecting all other seeds that are disposed at a height of the ceiling 430 or higher.

In use, the extra seeds that are urged away from the retaining wall 424 by the flange 428 remain in the device 420 and return back into the main circular flow of the device 420. Further, the bulk of seeds that don't enter the opening of the lumen 426 as they pass on the disk 422 can apply a force on the column of seeds positioned to enter the lumen 426 and thus help to maintain a steady seed supply through the lumen 426. In accordance with one implementation, the configuration of the spinning disk 422 in combination with the flange 428 results in a combination of forces created on the seeds that enable the device 420 to work even when the device 420 is disposed at angles to the horizontal and/or in vibrating environments (similar to what is found on an agricultural planter).

In various implementations, the seed singulation device 420 as disclosed or contemplated herein need not be used solely with planting units. Instead, in certain embodiments, the device 420 can be used as a stand-along seed counter 420. While known seed counters are based on a slower acting vibratory bowl feeder designs, the seed singulation device 420 operates at a much faster rate of seed singulation by comparison. In one embodiment, the device 420 has a seed presence sensor (not shown) positioned at the exit lumen 426, such as, for example, an infrared transmitter/receiver pair, capacitive presence sensor, or other known sensing technologies common in the industry. The seed sensor output would then be used by an electronic counting circuit to count the seeds as they pass. Alternatively, any known technology for counting the seeds can be used in combination with the singulation device 420.

Although the present invention has been described with reference to preferred embodiments, persons skilled in the art will recognize that changes may be made in form and detail without departing from the spirit and scope of the invention.

What is claimed is:

1. An apparatus for metering seed on an agricultural planter comprising:
   (a) a housing;
   (b) a seed chamber defined within the housing, the seed chamber comprising:
      (i) a seed launching position configured to sequentially receive seeds; and
      (ii) a seed ejection lumen in fluidic communication with the seed launching position;
   (c) a seed receiving lumen defined within the housing in fluidic communication with the seed chamber, wherein the seed receiving lumen is disposed adjacent to the seed launching position;
   (d) a first air source in fluidic communication with the seed chamber, wherein the first air source is constructed and arranged to provide a continuous stream of air; and
   (e) an air pulse source associated with the housing, the air pulse source comprising:
      (i) a second air source; and
      (ii) a repeating air pulse generator operably coupled to the second air source, wherein the air pulse generator is in fluidic communication with the seed chamber, wherein the repeating air pulse generator is constructed and arranged to generate repeating air pulses from the second air source, wherein:
   (i) the first air source is in fluidic communication with the seed chamber via a first air intake lumen, and wherein the repeating air pulse generator is in fluidic communication with the seed chamber via a second air intake lumen disposed adjacent to the seed receiving lumen such that each of the repeating air pulses is configured to urge a seed from the seed receiving lumen toward the seed launching position, and
   (ii) seeds sequentially disposed on the seed launching position are ejected via the ejection lumen in a serial fashion.

2. The apparatus of claim 1, wherein the seed receiving lumen is coupleable with a bulk seed container.

3. The apparatus of claim 1, wherein the seed ejection lumen is coupleable with a seed delivery apparatus.

4. The apparatus of claim 1, wherein the second air intake lumen and the seed chamber form a main air path such that repeating air pulses from the air pulse generator pass through the second air intake lumen, the seed launching position, and the seed ejection lumen.

5. The apparatus of claim 4, wherein the main air path is disposed substantially horizontally.

6. The apparatus of claim 1, wherein the second air source is configured to provide pressurized air ranging from about 20 to about 60 psi.

7. The apparatus of claim 1, wherein the repeating air pulse generator is a valve.

8. The apparatus of claim 1, wherein the seed receiving lumen is disposed at an angle in relation to a horizontal reference point with respect to the housing.

9. An apparatus for metering seed on an agricultural planter comprising:
   (a) a housing;
   (b) a seed chamber defined within the housing, the seed chamber comprising:
      (i) a seed launching position configured to sequentially receive seeds; and
      (ii) a seed ejection lumen in fluidic communication with the seed launching position;
   (c) a seed receiving lumen defined within the housing in fluidic communication with the seed chamber, wherein the seed receiving lumen is disposed adjacent to the seed launching position;
   (d) a first air source in fluidic communication with the seed chamber, wherein the first air source is constructed and arranged to provide a continuous stream of air;
   (e) an air pulse source associated with the housing, the air pulse source comprising:
      (i) a second air source; and
      (ii) a repeating air pulse generator operably coupled to the second air source, wherein the air pulse generator is in fluidic communication with the seed chamber, wherein the repeating air pulse generator is constructed and arranged to generate repeating air pulses from the second air source; and
   (f) a seed retention structure disposed across at least a portion of a width of the seed chamber, wherein:
   (i) the first air source is in fluidic communication with the seed chamber via a first air intake lumen, and wherein the repeating air pulse generator is in fluidic communication with the seed chamber via a second air intake lumen disposed adjacent to the seed receiving lumen such that each of the repeating air pulses is configured to urge a seed from the seed receiving lumen toward the seed launching position, and (ii) the seed retention structure is positioned adjacent to the seed launching position.

10. A system for planting seed comprising:
(a) a planter having a plurality of row units, each row unit comprising a furrow opening mechanism, wherein each row unit is operably coupled to a bulk seed supply; and
(b) a plurality of seed meters comprising:
  (i) a housing;
  (ii) a seed chamber defined within the housing, the seed chamber comprising:
    (A) a seed launching position configured to sequentially receive seeds; and
    (B) a seed ejection lumen in fluidic communication with the seed launching position;
  (iii) a seed receiving lumen defined within the housing in fluidic communication with the seed chamber, wherein the seed receiving lumen is disposed adjacent to the seed launching position;
  (iv) a first air source in fluidic communication with the seed chamber, wherein the first air source is constructed and arranged to provide a continuous stream of air; and
  (v) an air pulse source associated with the housing, the air pulse source comprising:
    (A) a second air source; and
    (B) a repeating air pulse generator operably coupled to the second air source, wherein the air pulse generator is in fluidic communication with the seed chamber, wherein the repeating air pulse generator is constructed and arranged to generate repeating air pulses from the second air source,
(c) a programmable controller operably coupled to the repeating air pulse generator of each of the plurality of seed meters,
wherein:
  (i) the first air source is in fluidic communication with the seed chamber via a first air intake lumen, and wherein the repeating air pulse generator is in fluidic communication with the seed chamber via a second air intake lumen disposed adjacent to the seed receiving lumen such that each of the repeating air pulses is configured to urge a seed from the seed receiving lumen toward the seed launching position, and
  (ii) the programmable controller is configured to control the repeating air pulse generator based on input air pressure, desired seed spacing, ground speed, and turning radius.

11. The system of claim 10, further comprising at least one sensor disposed on each of the plurality of the seed meters, wherein the at least one sensor is operably coupled to the programmable controller.

12. The apparatus of claim 1, wherein the first and second air sources are configured to provide pressurized air ranging from about 0.5 to about 5 psi.

13. The apparatus of claim 9, wherein the second air source is configured to provide pressurized air ranging from about 20 to about 60 psi.

14. The apparatus of claim 9, wherein the seed receiving lumen is coupleable with a bulk seed container.

15. The apparatus of claim 9, wherein the seed ejection lumen is coupleable with a seed delivery apparatus.

16. The apparatus of claim 9, wherein the second air intake lumen and the seed chamber form a main air path such that repeating air pulses from the air pulse generator pass through the second air intake lumen, the seed launching position, and the seed ejection lumen.

17. The apparatus of claim 16, wherein the main air path is disposed substantially horizontally.

18. The system of claim 10, wherein the second air source is configured to provide pressurized air ranging from about 20 to about 60 psi.

19. The system of claim 10, wherein the repeating air pulse generator is a valve.

20. The system of claim 10, wherein the seed receiving lumen is disposed at an angle in relation to a horizontal reference point with respect to the housing.

* * * * *